US012651823B2

(12) United States Patent
Chin et al.

(10) Patent No.: US 12,651,823 B2
(45) Date of Patent: Jun. 9, 2026

(54) MULTIBAND ANTENNA DEVICE

(71) Applicant: Airgain, Inc., San Diego, CA (US)

(72) Inventors: Cheng-Yuan Chin, San Diego, CA (US); Devis Iellici, Cambridge (GB)

(73) Assignee: Airgain, Inc., San Diego, CA (US)

( * ) Notice: Subject to any disclaimer, the term of this patent is extended or adjusted under 35 U.S.C. 154(b) by 7 days.

(21) Appl. No.: 18/909,372

(22) Filed: Oct. 8, 2024

(65) Prior Publication Data

US 2025/0149772 A1 May 8, 2025

Related U.S. Application Data

(60) Provisional application No. 63/547,420, filed on Nov. 6, 2023.

(51) Int. Cl.

| | |
|---|---|
| ***H01Q 1/22*** | (2006.01) |
| ***H01Q 1/00*** | (2006.01) |
| ***H01Q 1/48*** | (2006.01) |
| ***H01Q 5/20*** | (2015.01) |
| ***H01Q 9/04*** | (2006.01) |

(52) U.S. Cl.
CPC ............... *H01Q 1/22* (2013.01); *H01Q 1/002* (2013.01); *H01Q 1/48* (2013.01); *H01Q 5/20* (2015.01); *H01Q 9/0407* (2013.01)

(58) Field of Classification Search
CPC ............ H01Q 1/22; H01Q 5/20; H01Q 1/002; H01Q 1/48; H01Q 9/0407
See application file for complete search history.

(56) References Cited

U.S. PATENT DOCUMENTS

| | | | | |
|---|---|---|---|---|
| 10,476,170 | B2 | 11/2019 | Rajagopalan | |
| 10,978,797 | B2 | 4/2021 | Edwards | |
| 2017/0301991 | A1* | 10/2017 | Stratis | H01Q 1/42 |
| 2020/0303820 | A1 | 9/2020 | Jang | |
| 2021/0305697 | A1 | 9/2021 | Chen | |

* cited by examiner

*Primary Examiner* — Graham P Smith
(74) *Attorney, Agent, or Firm* — Mueting Raasch Group

(57) ABSTRACT

The present disclosure provides an antenna device including a ground plane, a plurality of omni-directional antennas connected to the ground plane, a directional antenna connected to the ground plane, and a wall structure including a metal and connected to the ground plane, the wall structure surrounding the directional antenna and disposed between the directional antenna and the plurality of omni-directional antennas.

24 Claims, 13 Drawing Sheets

300

400

MULTIBAND ANTENNA DEVICE

CROSS REFERENCE TO RELATED APPLICATIONS

This application claims the benefit of 63/547,420, filed Nov. 6, 2023, the disclosure of which is incorporated by reference herein in its entirety.

SUMMARY

One embodiment is directed to an antenna device including a ground plane, a plurality of omni-directional antennas connected to the ground plane, a directional antenna connected to the ground plane, and a wall structure including a metal and connected to the ground plane, the wall structure surrounding the directional antenna and disposed between the directional antenna and the plurality of omni-directional antennas.

Another embodiment is directed to an antenna device for a cellular communications tower. The antenna device includes a ground plane, a plurality of omni-directional antennas connected to the ground plane, a directional antenna connected to the ground plane, a wall structure including a metal and connected to the ground plane, the wall structure surrounding the directional antenna and disposed between the directional antenna and the plurality of omni-directional antennas, and a case enclosing the ground plane, the plurality of omni-directional antennas, and the wall structure.

A further embodiments is directed to a multiband antenna device including a ground plane, a plurality of omni-directional antennas connected to the ground plane, the plurality of omni-directional antennas associated with a first frequency band, a directional antenna connected to the ground plane, the directional antenna associated with a second frequency band, and a wall structure comprising a metal and connected to the ground plane, the wall structure surrounding the directional antenna and disposed between the directional antenna and the plurality of omni-directional antennas, wherein the first frequency band is lower than the second frequency band by at least one GHz.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
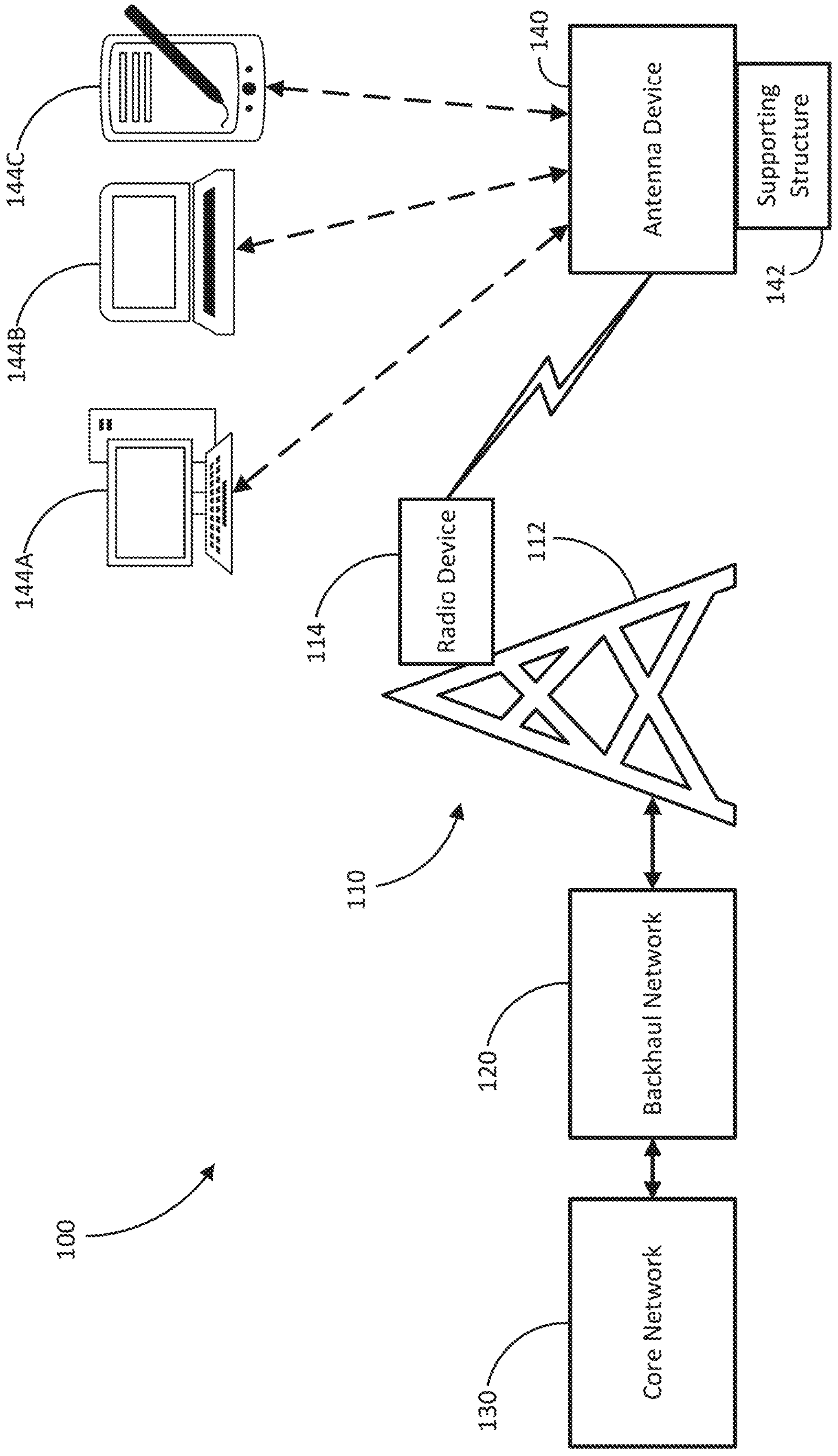
FIG. 1 illustrates a wireless network in accordance with various embodiments.

Embodiments of the disclosure are directed to antenna devices for use in wireless communications. In particular, certain embodiments are directed towards multiband antennas for use in 5G cellular communications. For example, certain embodiments are directed towards antenna devices that transmit and/or receive on a relatively lower frequency such as the n5 5G band as well as a relative higher frequency such as the n77 5G band. Furthermore, certain embodiments are directed towards antenna devices that transmit and/or receive using both directional antennas (e.g., high frequency directional antennas) and omnidirectional antennas (e.g., low frequency omnidirectional antennas).

Each antenna device can include an electrically and/or thermally conductive wall structure. A wall structure of the present disclosure provides a number of advantages over conventional systems. In particular, the wall structure can be configured to act as a heat sink and/or enhance at least one of a peak gain of a directional antenna and/or an isolation between omni-directional antennas. In this way, the wall structure can enhance the performance of multiband antenna systems that are used in wireless communications (e.g., 5G wireless networks).

Embodiments of the disclosure are defined in the claims. However, below there is provided a non-exhaustive listing of non-limiting examples. Any one or more of the features of these examples may be combined with any one or more features of another example, embodiment, or aspect described herein.

Example Ex1. An antenna device comprises a ground plane, a plurality of omni-directional antennas connected to the ground plane, a directional antenna connected to the ground plane, and a wall structure comprising a metal and connected to the ground plane, the wall structure surrounding the directional antenna and disposed between the directional antenna and the plurality of omni-directional antennas.

Example Ex2. The antenna device according to Example Ex1, wherein the wall structure has at least two planes of symmetry.

Example Ex3. The antenna device according to Example Ex1, wherein the wall structure has at least three planes of symmetry.

Example Ex4. The antenna device according to Example Ex1, wherein each omni-directional antenna included in the plurality of omni-directional antennas is arranged in a common orientation and distance in relation to the wall structure.

Example Ex5. The antenna device according to Example Ex1, wherein the antenna device further comprises an radio frequency amplifier system coupled to the directional antenna and the plurality of omni-directional antennas, a support structure supporting the ground plane, and a case enclosing the ground plane, the plurality of omni-directional antennas, the directional antenna, the radio frequency amplifier system, and the support structure.

Example Ex6. The antenna device according to Example Ex1, wherein the wall structure and the plurality of omni-directional antennas are positioned in a rotationally symmetrical arrangement.

Example Ex7. The antenna device according to Example Ex6, wherein the rotationally symmetrical arrangement has rotational symmetry of at least four-fold.

Example Ex8. The antenna device according to Example Ex1, wherein the wall structure, the plurality of omni-directional antennas, and the directional antenna are positioned in a rotationally symmetrical arrangement.

Example Ex9. The antenna device according to Example Ex8, wherein the rotationally symmetrical arrangement has rotational symmetry of at least four-fold.

Example Ex10. The antenna device according to Example Ex1, wherein the antenna device is a 5G antenna device.

Example Ex11. The antenna device according to Example Ex1, wherein the directional antenna is configured to transmit and receive on the n77 5G band, and each of the omni-directional antennas included in the plurality of omni-directional antennas is configured to transmit and receive on the n5 5G band.

Example Ex12. The antenna device according to Example Ex1, wherein the wall structure comprises an extrusion.

Example Ex13. The antenna device according to Example Ex1, wherein the wall structure comprises at least four walls, each wall included in the at least four walls comprising a flat surface.

Example Ex14. The antenna device according to Example Ex13, wherein the directional antenna comprises four approximately straight edges, and each of the at least four walls is arranged approximately parallel to one of the four approximately straight edges.

Example Ex15. The antenna device according to Example Ex14, wherein each omni-directional antenna included in the plurality of omni-directional antennas comprises a substantially flat face arranged approximately parallel to one of the four approximately straight edges.

Example Ex16. The antenna device according to Example Ex1, wherein the directional antenna is configured to transmit and receive on a predetermined wavelength, and the wall structure extends orthogonally away from the ground plane a distance of about one eight to one half of the predetermined wavelength.

Example Ex17. The antenna device according to Example Ex1, wherein the wall structure is configured to function as a heat sink for at least one of the ground plane, the directional antenna, or the plurality of omni-directional antennas.

Example Ex18. The antenna device according to Example Ex1, wherein the wall structure is configured to enhance the peak gain of the directional antenna as compared to if the wall structure was not present.

Example Ex19. The antenna device according to Example Ex18, wherein the wall structure is configured to enhance the peak gain of the directional antenna by at least ten percent as compared to if the wall structure was not present.

Example Ex20. The antenna device according to Example Ex1, wherein the wall structure is configured to enhance the isolation of each omni-directional antenna included in the plurality of omni-directional antennas as compared to if the wall structure was not present.

Example Ex21. The antenna device according to Example Ex20, wherein the wall structure is configured to enhance the isolation of each omni-directional antenna included in the plurality of omni-directional antennas by at least ten percent as compared to if the wall structure was not present.

Example Ex22. The antenna device according to Example Ex1, wherein the directional antenna is configured to transmit and receive in the range of 1.71 to 4.2 GHz.

Example Ex23. The antenna device according to Example Ex1, wherein each omni-directional antenna included in the plurality of omni-directional antennas is configured to transmit and receive in the range of 617 MHz to 960 MHz.

Example Ex24. The antenna device according to Example Ex1, wherein the wall structure comprises at least four walls, each wall included in the at least four walls comprising a flat surface facing at least one of the omni-directional antennas included in the plurality of omni-directional antennas.

Example Ex25. The antenna device according to Example Ex24, wherein each flat surface extends away from the ground plane at an angle of about forty-five degrees to ninety degrees.

Example Ex26. The antenna device according to Example Ex1, wherein the wall structure comprises stainless steel.

Example Ex27. The antenna device according to Example Ex1, wherein the wall structure comprises electroplated plastic.

Example Ex28. The antenna device according to Example Ex1, wherein the wall structure comprises a plurality of walls forming a continuous wall.

Example Ex29. The antenna device according to Example Ex1, wherein the wall structure comprises a plurality of walls, each wall included in the plurality of walls being spaced a predetermined distance away from neighboring walls included in the plurality of walls.

Example Ex30. The antenna device according to Example Ex1, wherein the wall structure consists of one or more metals.

Example Ex31. The antenna device according to Example Ex1, wherein the directional antenna is configured to transmit or receive a first signal at a first frequency and transmit or receive a second signal at a second frequency.

Example Ex32. The antenna device according to Example Ex31, wherein the first frequency is equal to the second frequency, and wherein the directional antenna is configured to transmit the first signal and the second signal simultaneously.

Example Ex33. The antenna device according to Example Ex31, wherein the first frequency is greater than the second frequency.

Example Ex34. The antenna device according to Example Ex31, wherein the first signal has a first polarization, the second signal has a second polarization, the first polarization being different than the second polarization.

Example Ex35. The antenna device according to Example Ex34, wherein the first polarization is orthogonal to the second polarization.

Example Ex36. An antenna device for a cellular communications tower comprises a ground plane, a plurality of omni-directional antennas connected to the ground plane, a directional antenna connected to the ground plane, a wall structure comprising a metal and connected to the ground plane, the wall structure surrounding the directional antenna and disposed between the directional antenna and the plurality of omni-directional antennas, and a case enclosing the ground plane, the plurality of omni-directional antennas, and the wall structure, the case configured to couple to the cellular communications tower.

Example Ex37. The antenna device according to Example Ex36, wherein the wall structure has at least two planes of symmetry.

Example Ex38. The antenna device according to Example Ex36, wherein the wall structure has at least three planes of symmetry.

Example Ex39. The antenna device according to Example Ex36, wherein each omni-directional antenna included in the plurality of omni-directional antennas is arranged in a common orientation and distance in relation to the wall structure.

Example Ex40. The antenna device according to Example Ex36 further comprising an radio frequency amplifier system coupled to the directional antenna and the plurality of omni-directional antennas, and a support structure supporting the ground plane, wherein the case further encloses the radio frequency amplifier system and the support structure.

Example Ex41. The antenna device according to Example Ex36, wherein the wall structure and the plurality of omni-directional antennas are positioned in a rotationally symmetrical arrangement.

Example Ex42. The antenna device according to Example Ex41 wherein the rotationally symmetrical arrangement has rotational symmetry of at least four-fold.

Example Ex43. The antenna device according to Example Ex36, wherein the wall structure, the plurality of omni-directional antennas, and the directional antenna are positioned in a rotationally symmetrical arrangement.

Example Ex44. The antenna device according to Example Ex43, wherein the rotationally symmetrical arrangement has rotational symmetry of at least four-fold.

Example Ex45. The antenna device according to Example Ex36, wherein the antenna device is a 5G antenna device.

Example Ex46. The antenna device according to Example Ex36, wherein the directional antenna is configured to transmit and receive on the n77 5G band, and each of the omni-directional antennas included in the plurality of omni-directional antennas is configured to transmit and receive on the n5 5G band.

Example Ex47. The antenna device according to Example Ex36, wherein the wall structure comprises an extrusion.

Example Ex48. The antenna device according to Example Ex36, wherein the wall structure comprises at least four walls, each wall included in the at least four walls comprising a flat surface.

Example Ex49. The antenna device according to Example Ex48, wherein the directional antenna comprises four approximately straight edges, and each of the at least four walls is arranged approximately parallel to one of the four approximately straight edges.

Example Ex50. The antenna device according to Example Ex48, wherein each omni-directional antenna included in the plurality of omni-directional antennas comprises a substantially flat face arranged approximately parallel to one of the four approximately straight edges.

Example Ex51. The antenna device according to Example Ex36, wherein the directional antenna is configured to transmit and receive a predetermined wavelength, and the wall structure extends orthogonally away from the ground plane a distance of about one eight to one half of the predetermined wavelength.

Example Ex52. The antenna device according to Example Ex36, wherein the wall structure is configured to function as a heat sink for at least one of the ground plane, the directional antenna, or the plurality of omni-directional antennas.

Example Ex53. The antenna device according to Example Ex36, wherein the wall structure is configured to enhance the peak gain of the directional antenna as compared to if the wall structure was not present.

Example Ex54. The antenna device according to Example Ex53, wherein the wall structure is configured to enhance the peak gain of the directional antenna by at least ten percent as compared to if the wall structure was not present.

Example Ex55. The antenna device according to Example Ex36, wherein the wall structure is configured to enhance the isolation of each omni-directional antenna included in the plurality of omni-directional antennas as compared to if the wall structure was not present.

Example Ex56. The antenna device according to Example Ex55, wherein the wall structure is configured to enhance the isolation of each omni-directional antenna included in the plurality of omni-directional antennas by at least ten percent as compared to if the wall structure was not present.

Example Ex57. The antenna device according to Example Ex36, wherein the directional antenna is configured to transmit and receive in the range of 1.71 to 4.2 GHz.

Example Ex58. The antenna device according to Example Ex36, wherein each omni-directional antenna included in the plurality of omni-directional antennas is configured to transmit and receive in the range of 617 MHz to 960 MHz.

Example Ex59. The antenna device according to Example Ex36, wherein the wall structure comprises at least four walls, each wall included in the at least four walls comprising a flat surface facing at least one of the omni-directional antennas included in the plurality of omni-directional antennas.

Example Ex60. The antenna device according to Example Ex36, wherein each flat surface extends away from the ground plane at an angle of about forty-five degrees to ninety degrees.

Example Ex61. The antenna device according to Example Ex36, wherein the wall structure comprises stainless steel.

Example Ex62. The antenna device according to Example Ex36, wherein the wall structure comprises electroplated plastic.

Example Ex63. The antenna device according to Example Ex36, wherein the wall structure comprises a plurality of walls forming a continuous wall.

Example Ex64. The antenna device according to Example Ex36, wherein the wall structure comprises a plurality of walls, each wall included in the plurality of walls being spaced a predetermined distance away from neighboring walls included in the plurality of walls.

Example Ex65. The antenna device according to Example Ex36, wherein the wall structure consists of one or more metals.

Example Ex66. The antenna device according to Example Ex36, wherein the directional antenna is configured to transmit or receive a first signal at a first frequency and transmit or receive a second signal at a second frequency.

Example Ex67. The antenna device according to Example Ex36, wherein the first frequency is equal to the second frequency, and wherein the directional antenna is configured to transmit the first signal and the second signal simultaneously.

Example Ex68. The antenna device according to Example Ex36, wherein the first frequency is greater than the second frequency.

Example Ex69. The antenna device according to Example Ex36, wherein the first signal has a first polarization, the second signal has a second polarization, the first polarization being different than the second polarization.

Example Ex70. The antenna device according to Example Ex69, wherein the first polarization is orthogonal to the second polarization.

Example Ex71. A multiband antenna device comprises a ground plane, a plurality of omni-directional antennas connected to the ground plane, the plurality of omni-directional antennas associated with a first frequency band, a directional antenna connected to the ground plane, the directional antenna associated with a second frequency band, and a wall structure comprising a metal and connected to the ground plane, the wall structure surrounding the directional antenna and disposed between the directional antenna and the plurality of omni-directional antennas, wherein the first frequency band is lower than the second frequency band by at least one GHz.

FIG. 1 illustrates a wireless network 100 in accordance with various embodiments. The wireless network can include a communications tower 110, a backhaul network 120, and a core network 130. The communications tower 110 can include a tower structure 112 and an radio device 114 coupled to the tower structure. The wireless network 100 can also include an antenna device 140. The antenna device 140 can transmit data to and/or receive data from the communications tower 110. More specifically, the antenna device 140 can transmit data to and/or receive data from the radio device 114.

The core network 130, the backhaul network 120, the radio device 114, and/or the antenna device 140 may be coupled together and in communication with each other. In some implementations, the antenna device 140 may transmit or receive information such as voice data, text messages (e.g., short messaging service (SMS) data), internet data, and/or other information. In some implementations, the core network 130, the backhaul network 120, the radio device 114, and/or the antenna device 140 can communicate using the Packet Forwarding Control Protocol (PFCP).

In some implementations, the radio device 114 can be a multiband 5G antenna device configured to transmit and/or receive on multiple frequency bands. For example, the radio device 114 can be configured to transmit and/or receive on both the n77 5G band and the n5 5G band. The antenna device 140 can be a multiband 5G device configured to communicated with the radio device 114 using the frequency bands associated with the radio device 114 (e.g., the n77 5G band and/or the n5 5G band). In 5G communications, it can be important to utilize multiple communication bands because of performance tradeoffs between bands. For example, relatively higher frequency bands, such as n77 5G, may be able to provide greater throughput speeds than relatively lower frequency bands such as n5 5G. However, relatively higher frequency bands may suffer from reduced overall range and/or reduced effectiveness near buildings and other obstacles. Therefore, it is important to have multiple frequency bands available in order for the radio device 114 and the antenna device 140 to properly communicate.

In some implementations, the antenna device 140 can be mounted on a supporting structure 142 such as a pole. In some implementations, the antenna device 140 can be mounted on a wall. In some implementations, the antenna device 140 may not be mounted to a structure (e.g., positioned on a table or desk). The wireless network 100 can also include one or more user devices 144A-C. The antenna device 140 can be in wireless communication with one or more of the user devices 144A-C (e.g., smartphones, tablet computers, laptop computers, desktop computers, etc.). In some implementations, the antenna device 140 can communicate with the user devices 144A-C over WiFi.

Figure 2:
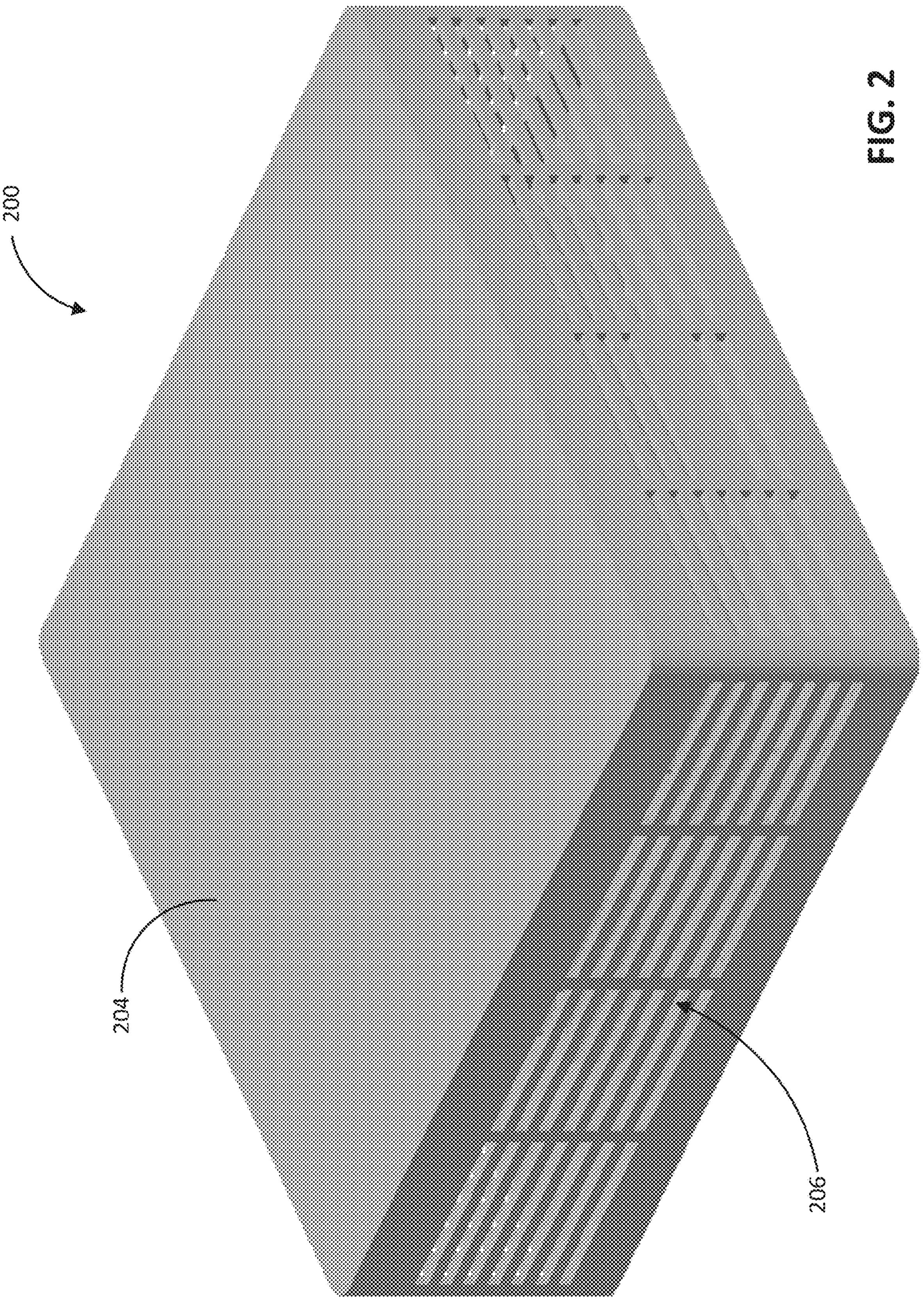
FIG. 2 illustrates a perspective view of an exterior of an antenna device in accordance with various embodiments.

FIG. 2 illustrates a perspective view of an exterior of a wireless communication device or antenna device 200 in accordance with various embodiments. In some implementations, the antenna device 200 in FIG. 2 can be used as the antenna device 140 in FIG. 1. The antenna device 200 can include a case 204. The case 204 can enclose other elements of the antenna device 200, which will be discussed further below in conjunction with FIGS. 3-7.

The case 204 can be formed of a plastic or other material that provides protection from environmental elements (e.g., precipitation) without negatively impacting transmission/reception performance of the antenna device 200. In some implementations, the case 204 can include one or more perforations 206 that provide ventilation for the antenna device 200. The perforations 206 can be sized to allow for ventilation without allowing undue moisture to enter the antenna device 200. In some implementations, the case can be configured to couple to a supporting structure (e.g., the supporting structure 142 in FIG. 1) or a wall.

Figure 3:
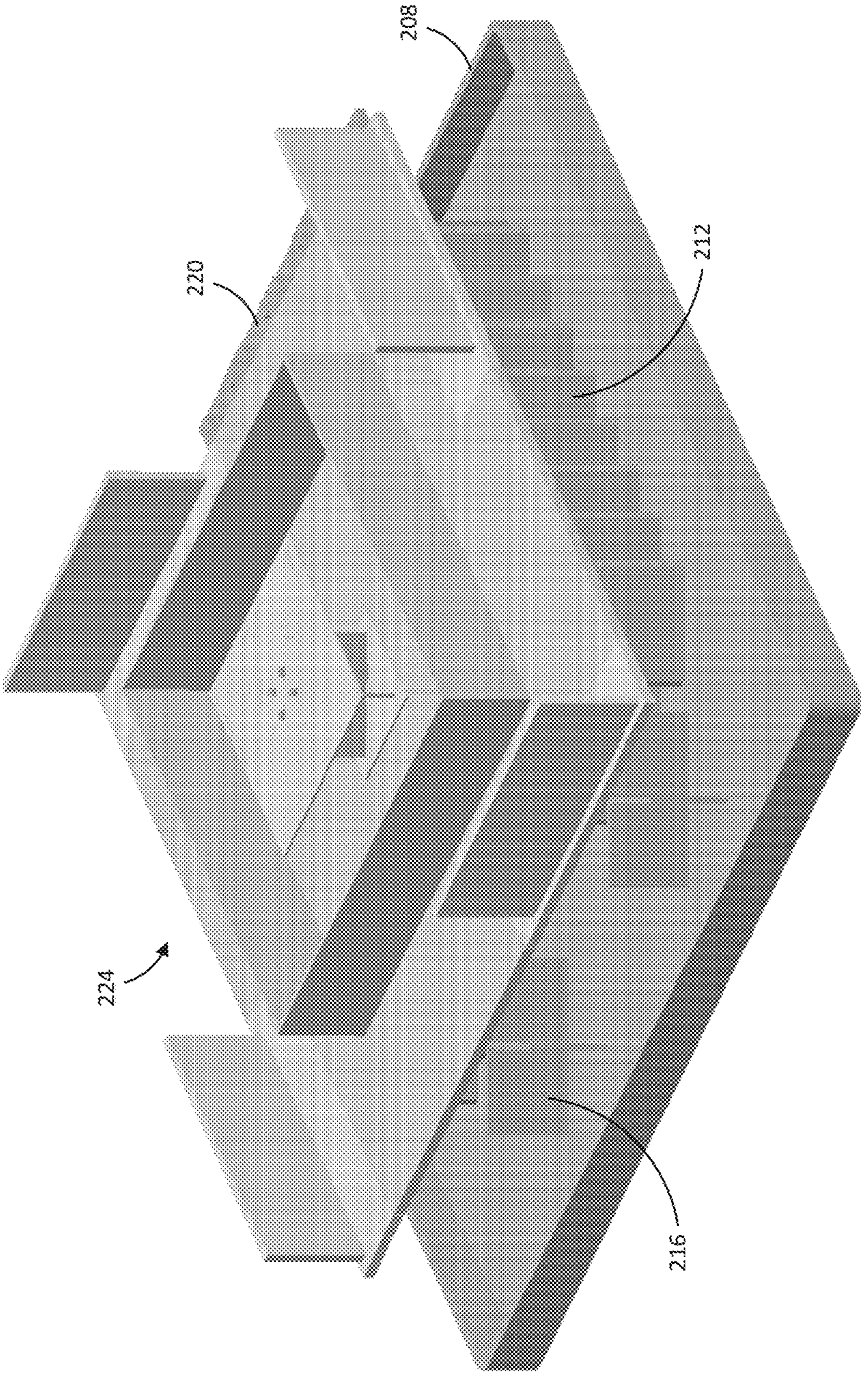
FIG. 3 illustrates a perspective view of certain elements of the antenna device of FIG. 2 in accordance with various embodiments.

Turning now to FIG. 3 as well as FIG. 2, FIG. 3 illustrates a perspective view of certain elements of the antenna device 200 of FIG. 2 in accordance with various embodiments. In particular, the antenna device 200 can include a base 208, one or more heat sinks 212, a WiFi antenna 216, a motherboard 220, and a multiband antenna system 224. In some implementations, the base 208 and the one or more heat sinks 212 can collectively be considered a support structure. In some implementations, the base 208 may be a portion of the case 204. In some embodiments, the antenna device 200 can include a plurality of standoffs (not shown) that extend from the base 208 to the multiband antenna system 224 to hold and support the multiband antenna system 224.

The one or more heat sinks 212 can be formed of a metal such as stainless steel. The one or more heat sinks 212 can be connected to the base 208 in order to improve thermal performance of the antenna device 200. The one or more heat sinks 212 may not be connected to the multiband antenna system 224 to prevent electrical coupling with the multiband antenna system 224. The motherboard 220 can include one or more receivers and/or one or more transmitters configured to receive and/or transmit on one or more frequencies. The motherboard 220 can also include one or more components such as a modem and/or a filter. The WiFi antenna 216 can be coupled to the multiband antenna system 224 via a WiFi modem included in the Motherboard 220 in order to communicate with the one or more user devices configured to communicate using WiFi protocols (e.g., the user devices in 144A-C in FIG. 1). The motherboard 220 can be coupled to the multiband antenna system 224 in order to receive or transmit using one or more antennas included in the multiband antenna system 224. In some implementations, the motherboard 220 can be coupled to the core network 130, the backhaul network 120, and/or the antenna device 140.

Figure 4:
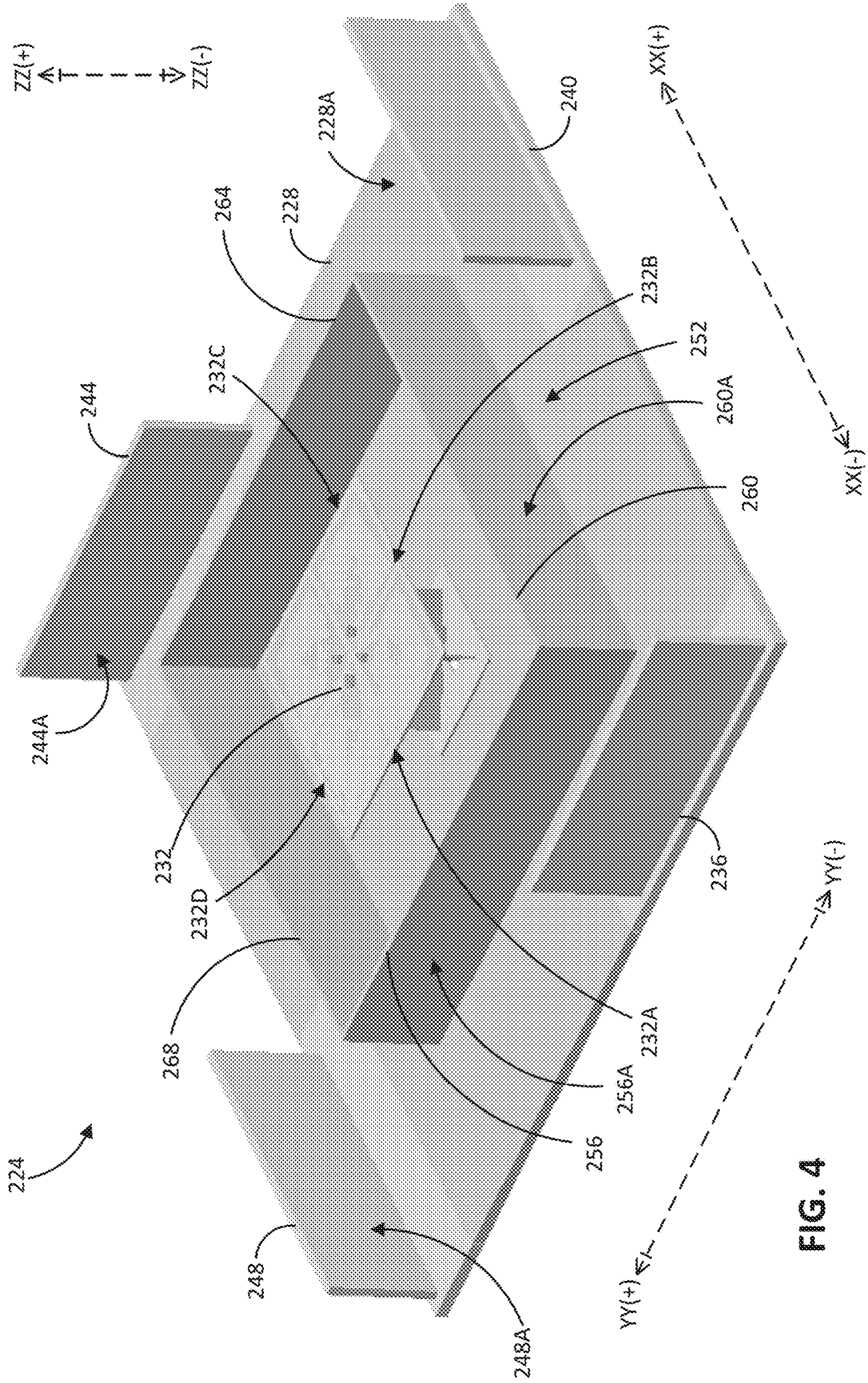
FIG. 4 illustrates a first perspective view of a multiband antenna system of the antenna device of FIG. 2 in accordance with various embodiments.

Turning now to FIG. 4 as well as FIGS. 2 and 3, FIG. 4 illustrates a first perspective view of the multiband antenna system 224 of the antenna device 200 of FIG. 2 in accordance with various embodiments. The multiband antenna system 224 can include a ground plane 228, a directional antenna 232, a first omni-directional antenna 236, a second omni-directional antenna 240, a third omni-directional antenna 244, a fourth omni-directional antenna 248, and a wall structure 252. The ground plane 228 can be a planar metallic structure. The ground plane 228 can be coupled and/or connected to each of the directional antenna 232, the first omni-directional antenna 236, the second omni-directional antenna 240, the third omni-directional antenna 244, and/or the fourth omni-directional antenna 248. In some implementations, ground plane 228 can be connected to each of the directional antenna 232, the first omni-directional antenna 236, the second omni-directional antenna 240, the third omni-directional antenna 244, and the fourth omni-directional antenna 248. In some implementations, the multiband antenna system 224 can include a plurality of directional antennas (e.g., four directional antennas). In some implementations, the multiband antenna system 224 can include more than four omni-directional antennas (e.g., eight omni-directional antennas).

The first omni-directional antenna 236, the second omni-directional antenna 240, the third omni-directional antenna 244, and the fourth omni-directional antenna 248 can be referred to as a plurality of omni-directional antennas. In some implementations, each antenna included in the plurality of omni-directional antennas 236-248 can be configured to transmit and/or receive on a common frequency band (e.g., n5 5G). In some implementations, each antenna included in the plurality of omni-directional antennas 236-248 can be configured to transmit and/or receive on a set of frequency bands included in a range of about 617-4200 MHz. In some implementations, each antenna included in the plurality of omni-directional antennas 236-248 can be configured to transmit and/or receive on a set of frequency bands included in a range of about 617-2700 MHZ. In some implementations, the directional antenna 232 can be configured to transmit and/or receive on a relatively higher frequency band as compared to the antennas included in the plurality of omni-directional antennas, and may be referred to as a high band antenna. In some implementations, the directional antenna 232 can include one or more feeding ports (not shown). For example, the directional antenna 232 can include a single feeding port or two feeding ports. In some implementations, the directional antenna can include two feeding ports having two orthogonal polarizations. If the directional antenna 232 includes multiple feeding ports, the directional antenna 232 can act as multiple antennas. Thus, the directional antenna 232 may transmit two or more signals. In some implementations, the directional antenna can transmit the two or more signals on the same frequency. In some implementations, the directional antenna can transmit each of the two or more signals on different frequencies. In some implementations, the directional antenna can transmit each of the two or more signals in different polarizations (e.g., two orthogonal polarizations). Thus, each of the two or more signals may have a different polarizations. For example, the two signals may have orthogonal polarizations. In some implementations, the directional antenna 232 can be configured to transmit and/or receive on the n77 5G frequency band. In some implementations, the directional antenna 232 can be configured to transmit and/or receive on a set of frequency bands included in a range of about 617-4200 MHz. In some implementations, the directional antenna 232 can be configured to transmit and/or receive on a set of frequency bands included in a range of about 3300-4200 MHz.

In some implementations, the directional antenna 232 can include a number of straight edges. As shown, the directional antenna 232 can include a first straight edge 232A, a second straight edge 232B, a third straight edge 232C, and a fourth straight edge 232D. In some implementations, each of the first straight edge 232A, the second straight edge 232B, the third straight edge 232C, and the fourth straight edge 232D can extend for about thirty-five mm to forty-five mm.

Thus, the first straight edge 232A and the third straight edge 232C can extend about thirty-five mm to forty-five mm along the YY axis, and the second straight edge 232B and the fourth straight edge 232D can extend about thirty-five mm to forty-five mm along the XX axis.

In some implementations, each of the first straight edge 232A, the second straight edge 232B, the third straight edge 232C, and the fourth straight edge 232D can extend for about thirty-nine mm. In some implementations, each of the first omni-directional antenna 236, the second omni-directional antenna 240, the third omni-directional antenna 244, and the fourth omni-directional antenna 248 can be omni-directional antennas.

The Motherboard 220 in FIG. 3 can be coupled to the directional antenna 232, the first omni-directional antenna 236, the second omni-directional antenna 240, the third omni-directional antenna 244, and/or the fourth omni-directional antenna 248 in order to transmit or receive using one or more of the directional antenna 232, the first omni-directional antenna 236, the second omni-directional antenna 240, the third omni-directional antenna 244, or the fourth omni-directional antenna 248 included in the multiband antenna system 224.

The wall structure 252 can include a number of walls. As shown, the wall structure 252 can include a first wall 256, a second wall 260, a third wall 264, and a fourth wall 268. In some implementations, the first wall 256 can be connected to the second wall 260 and the fourth wall, the second wall 260 can be connected to the first wall 256 and the third wall 264, the third wall 264 can be connected to the second wall 260 and the fourth wall 268, and the fourth wall 268 can be connected to the third wall 264 and the first wall 256. In some implementations, each wall included in the wall structure 252 can be spaced apart from other walls by a predetermined distance. In some implementations, each wall included in the wall structure 252 can be spaced apart from other walls by about five mm to ten mm.

The wall structure 252 can partially or fully surround the directional antenna 232. In some implementations, the wall structure 252 can include a number of walls connected to the ground plane 228 and spaced away from each other and arranged around the directional antenna 232. In some implementations, the wall structure 252 can include a number of walls connected to the ground plane 228 and neighboring walls, forming a continuous wall structure fully surrounding the directional antenna 232 along the XX and YY axes. Thus, the wall structure 252 can be arranged around the directional antenna 232. The wall structure 252 can be disposed between the directional antenna 232 and each of the first omni-directional antenna 236, the second omni-directional antenna 240, the third omni-directional antenna 244, and the fourth omni-directional antenna 248. Thus, the wall structure 252 can demarcate the directional antenna 232 from each of the first omni-directional antenna 236, the second omni-directional antenna 240, the third omni-directional antenna 244, and the fourth omni-directional antenna 248 along the XX and/or YY axes.

Positioning the wall structure 252 between the directional antenna 232 and the omni-directional antennas 236-248 can enhance various performance aspects of the directional antenna 232 and the omni-directional antennas 236-248. For example, as compared to if the wall structure 252 was not present, the wall structure 252 can enhance the peak gain of the directional antenna 232, enhance the directivity of the directional antenna 232, enhance the isolation of each of the omni-directional antennas 236-248, enhance the isolation between each of the omni-directional antennas 236-248 and the directional antenna 232, and/or act as a heat sink to provide enhance thermal dissipation of various components such as the motherboard 220. Thus, the wall structure 252 improves the performance of certain multiband antenna systems.

In some implementations, each of the first wall 256, the second wall 260, the third wall 264, and the fourth wall 268 can be the same length. For example, each of the walls 256-268 can extend about seventy mm to ninety mm. Thus, the first wall 256 and the third wall 264 can extend about seventy mm to ninety mm along the YY axis, and the second wall 260 and the fourth wall 268 can extend about seventy mm to ninety mm along the XX axis. In some implementations, each of the walls 256-268 can extend about 82 mm.

In some implementations, the wall structure 252 can be formed as a single piece construction. In some implementations, the wall structure 252 can be formed by an extrusion procedure. Thus, the wall structure 252 can be an extrusion. In some implementations, the wall structure 252 can be formed by a molding procedure. The wall structure 252 can be include a metal. In some implementations, the wall structure 252 can be made from one or more metals exclusively. For example, the wall structure 252 can be stainless steel. In other implementations, the wall structure can be an electroplated plastic. If the wall structure 252 is exclusively metal, the wall structure 252 may function as a heat sink more effectively than if the wall structure 252 is an electroplated plastic. However, the wall structure 252 may provide transmission and performance benefits to the directional antenna 232 and/or one or more of the omni-directional antennas 236-248 if made from metal and/or electroplated plastic.

In some implementations, the wall structure 252 can be coupled and/or connected to the ground plane 228. More specifically, the wall structure 252 can be coupled and/or connected to a top face 228A of the ground plane 228. In some implementations, the wall structure 252 can be riveted to the ground plane 228. In some implementations, the wall structure 252 can be welded to the ground plane 228. The wall structure 252 can extend away from the ground plane (i.e., in the positive direction along the ZZ axis) a predetermined distance based the frequency band associated with the directional antenna 232. The frequency band may be associated with one or more preferred or nominal transmission wavelengths, and the predetermined distance can be selected based on one of the preferred transmission wavelengths. For example, if the transmission band is the n77 5G band, a nominal transmission frequency may be 3700 MHZ, which corresponds to a nominal wavelength of about eighty-one mm. In some implementations, the wall structure 252 can extend away from the ground plane 228 a distance of about one eighth to one half of the nominal wavelength. Thus, if the directional antenna 232 is configured to transmit and/or receive on the n77 5G band, the wall structure 252 can extend about ten mm to forty mm away from the ground plane 228. In a preferred embodiment, the wall structure 252 can extend away from the ground plane 228 about seventeen mm. In some implementations, the wall structure 252 can extend orthogonally away from the top face 228A of the ground plane 228. As will be discussed below, in other implementations, each wall included in the wall structure 252 can extend away from the top face 228A non-orthogonally.

Figure 5:
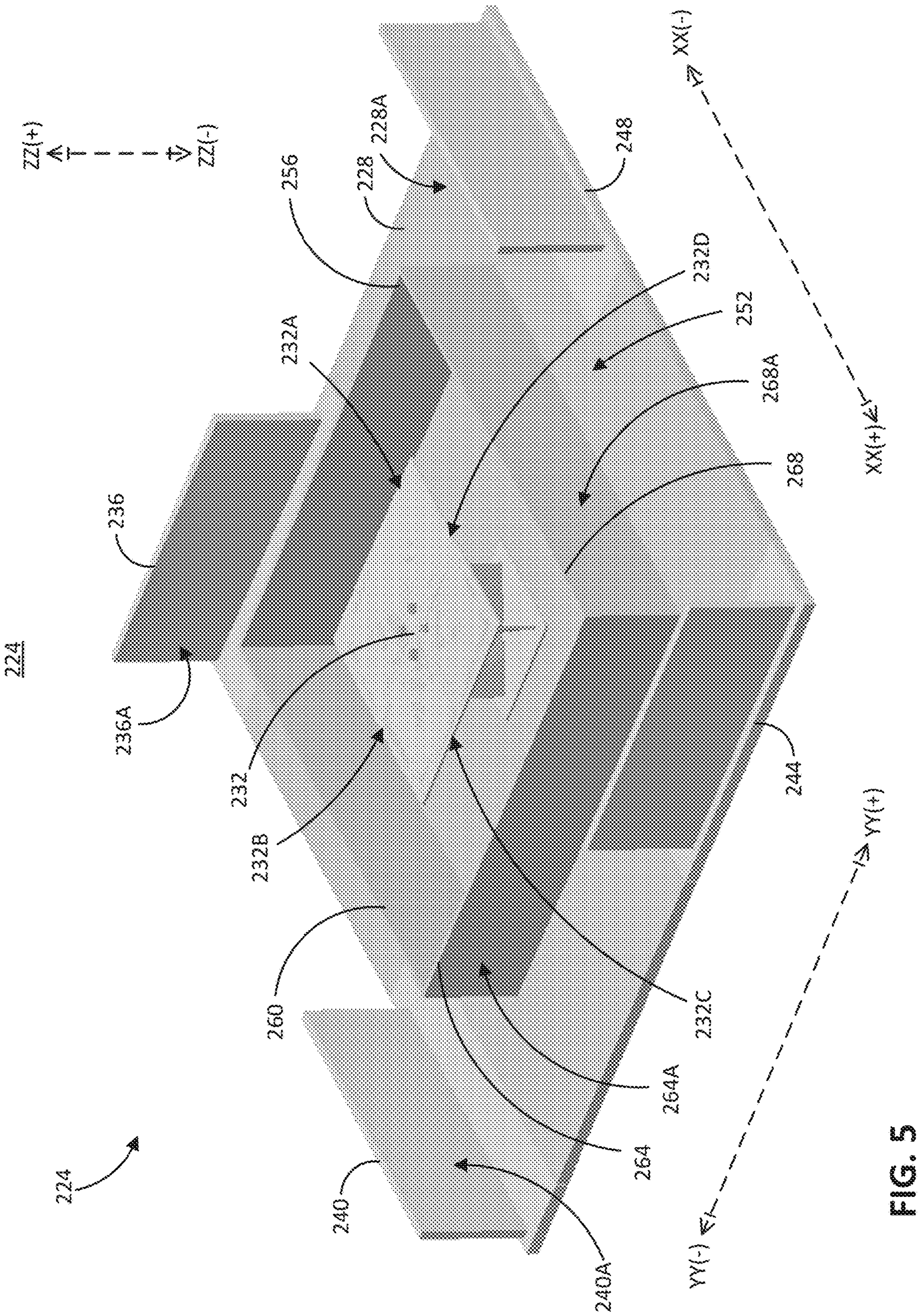
FIG. 5 illustrates a second perspective view of the multiband antenna system of FIG. 4 in accordance with various embodiments.

Turning now to FIG. 5 as well as FIGS. 2, 3, and 4, FIG. 5 illustrates a second perspective view of the multiband antenna system 224 of FIG. 4 in accordance with various embodiments. More specifically, FIG. 5 illustrates a view of the multiband antenna system 224 rotated one hundred and eighty degrees as compared to FIG. 4. As shown in FIGS. 4 and 5, each of the omni-directional antennas included in the plurality of omni-directional antennas can include a substantially flat face. More specifically, the first omni-directional antenna 236 can include a first antenna face 236A, the second omni-directional antenna 240 can include a second antenna face 240A, the third omni-directional antenna 244 can include a third antenna face 244A, and the fourth omni-directional antenna 248 can include a fourth antenna face 248A. Each of the first antenna face 236A, the second antenna face 240A, the third antenna face 244A, and the fourth antenna face 248A can be a substantially flat surface.

In some implementations, each of the antenna faces 236A-248A can be about forty-five mm to fifty-five mm in length, and about fifteen mm to twenty-five mm in height. Thus, the first antenna face 236A and the third antenna face 244A can extend for about forty-five mm to fifty-five mm along the YY axis, and the second antenna face 240A and the fourth antenna face 248A can extend for about forty-five mm to fifty-five mm along the XX axis. In some implementations, each of the antenna faces 236A-248A can extend about fifteen mm to twenty-five mm in the ZZ axis away from the ground plane (i.e., in the positive direction along the ZZ axis). In some implementations, each of the antenna faces 236A-248A can be about fifty-two mm in length, and about nineteen mm in height.

Each wall included in the wall structure 252 can include a substantially flat surface. More specifically, the first wall 256 can include a first wall face 256A, a second wall 260 can include a second wall face 260A, a third wall 264 can include a third wall face 264A, and a fourth wall 268 can include a fourth wall face 268A. Each of the wall faces 256A-268A can be oriented towards one or more antenna faces 236A-248A. In some implementations, each of the straight edges 232A-D of the directional antenna 232 can be arranged in parallel with at least one of the wall faces 256A-268A and/or at least one of the antenna faces 236A-248A. Arranging the straight edges 232A-D in parallel with portions of the wall structure 252 (e.g., the wall faces 256A-268A) may enhance the peak gain of the directional antenna 232. Arranging the wall faces 256A-268A in parallel with portions of the omni-directional antennas 236-248 (e.g., the antenna faces 236A-248A) may enhance the isolation of each of the omni-directional antennas 236-248.

Figure 6:
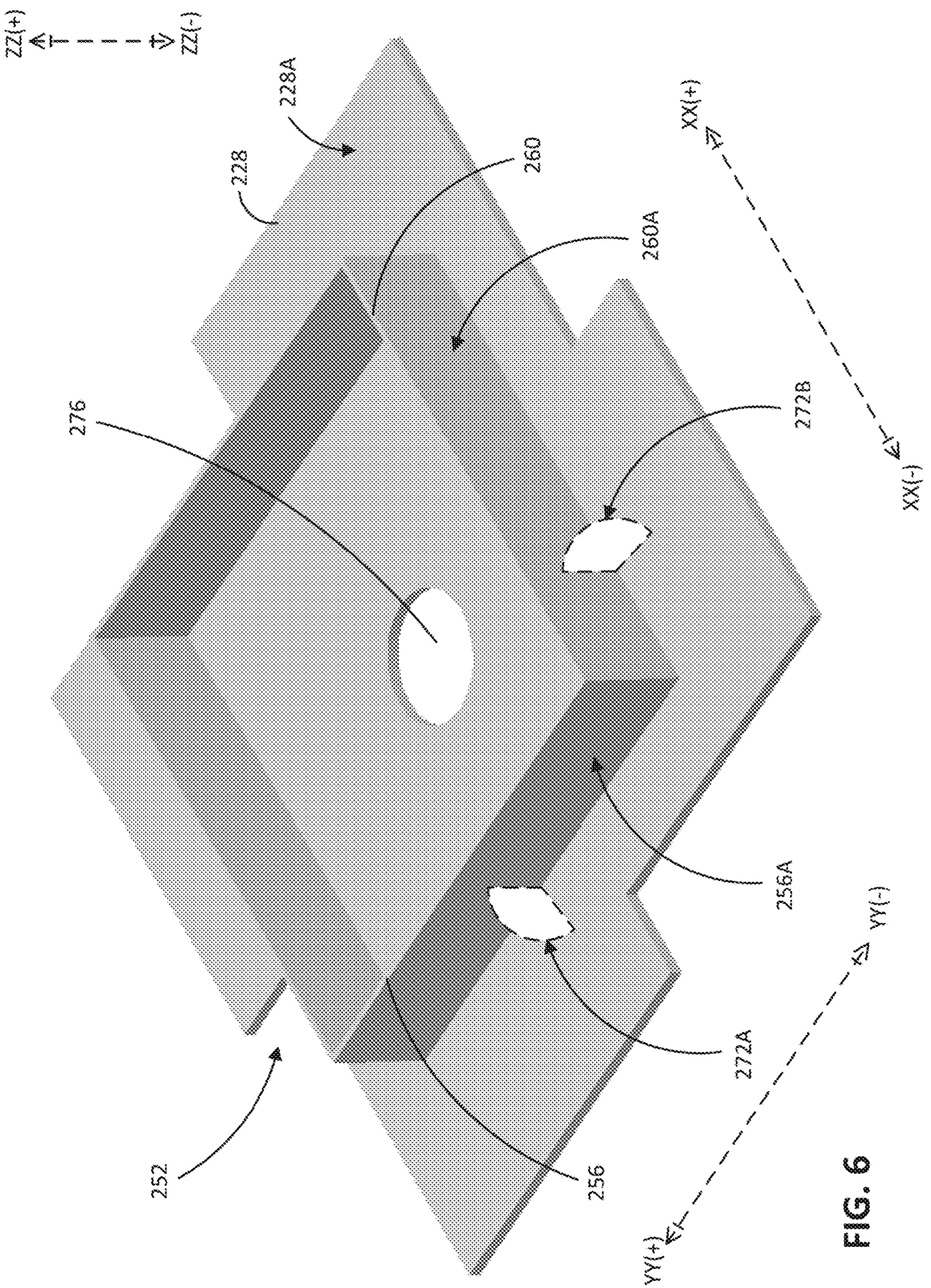
FIG. 6 illustrates a perspective view of a ground plane and a wall structure of the antenna device of FIG. 2 in accordance with various embodiments.

Turning now to FIG. 6 as well as FIGS. 2, 3, 4, and 5, FIG. 6 illustrates a perspective view of the ground plane 228 and the wall structure 252 of the antenna device 200 of FIG. 2 in accordance with various embodiments. As mentioned above, the wall structure 252 can extend orthogonally or non-orthogonally away from the top face 228A of the ground plane 228. For example, the first wall 256 can form a first wall angle 272A with the top face 228A of the ground plane 228, and the second wall 260 can form a second wall angle 272B with the top face 228A of the ground plane 228. More specifically, the first wall face 256A can form the first wall angle 272A with the top face 228A of the ground plane 228, and the second wall face 260A can form the second wall angle 272B with the top face 228A of the ground plane 228.

Figure 7:
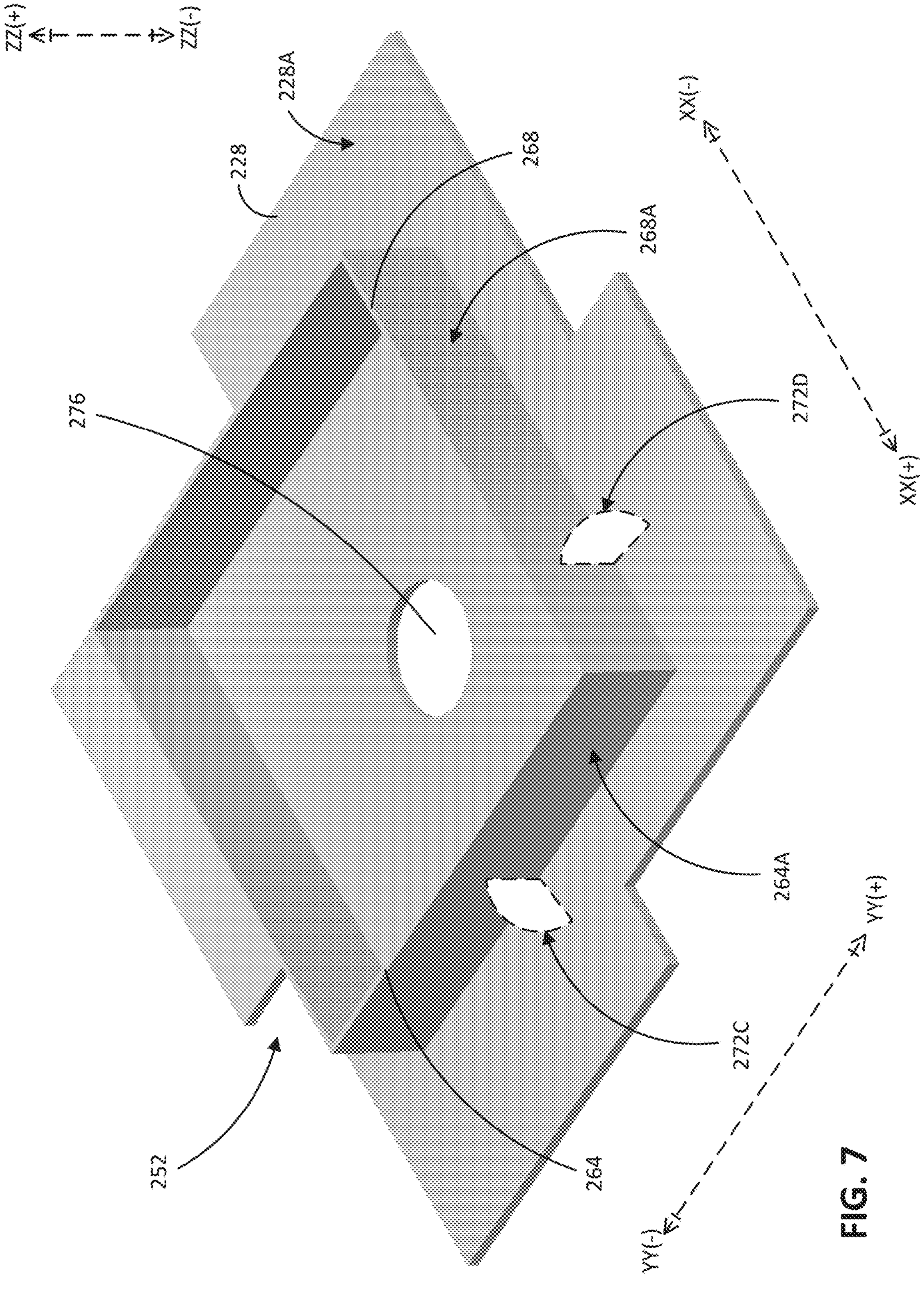
FIG. 7 illustrates a second perspective view of the ground plane and the wall structure of FIG. 6 in accordance with various embodiments.

Turning now to FIG. 7 as well as FIGS. 2, 3, 4, 5, and 6, FIG. 7 illustrates a second perspective view of the ground plane 228 and the wall structure 252 of FIG. 6 in accordance with various embodiments. More specifically, FIG. 7 illustrates a view of the ground plane 228 and the wall structure 252 rotated one hundred and eighty degrees as compared to FIG. 6. In some implementations, the third wall 264 can form a third wall angle 272C with the top face 228A of the ground plane 228, and the fourth wall 268 can form a fourth wall angle 272D with the top face 228A of the ground plane 228. More specifically, the third wall face 264A can form the third wall angle 272C with the top face 228A of the ground plane 228, and the fourth wall face 268A can form the second wall angle 272B with the top face 228A of the ground plane 228.

In some implementations, each of the wall angles 272A-D can be equal. In some implementations, each of the first wall angle 272A, the second wall angle 272B, the third wall angle 272C, and the fourth wall angle 272D can be about ninety degrees. In some implementations, each of the first wall angle 272A, the second wall angle 272B, the third wall angle 272C, and the fourth wall angle 272D can be about forty-five degrees. Lowering the angle of each wall face 256A-268A can improve various performance aspects of the directional antenna (e.g., peak gain and/or directivity) at the expense of reducing improvements to the performance of the omni-directional antennas 236-248 (e.g., isolation). Thus, a wall structure with wall angles 272A-D of about forty-degrees may enhance the peak gain of the directional antenna 232, enhance the directivity of the directional antenna 232, and/or enhance the isolation of each of the omni-directional antennas 236-248 as compared to if the wall structure was not present. However, a wall structure with wall angles 272A-D of about forty-degrees may provide more peak gain and/or directivity improvements to the directional antenna 232 and less isolation benefits to the omni-directional antennas 236-248 as compared to if the wall structure had wall angles 272A-D of about ninety degrees.

In some implementations, the wall angles 272A-D can be about forty-five to ninety degrees. In some implementations, the ground plane 228 can extend for about one hundred and forty mm along both the XX and YY axes. The ground plane 228 may form a roughly square shape with cutouts for mounting the omni-directional antennas 236-248. In some implementations, the ground plane 228 can include an opening 276 for mounting the directional antenna 232.

Figure 8:
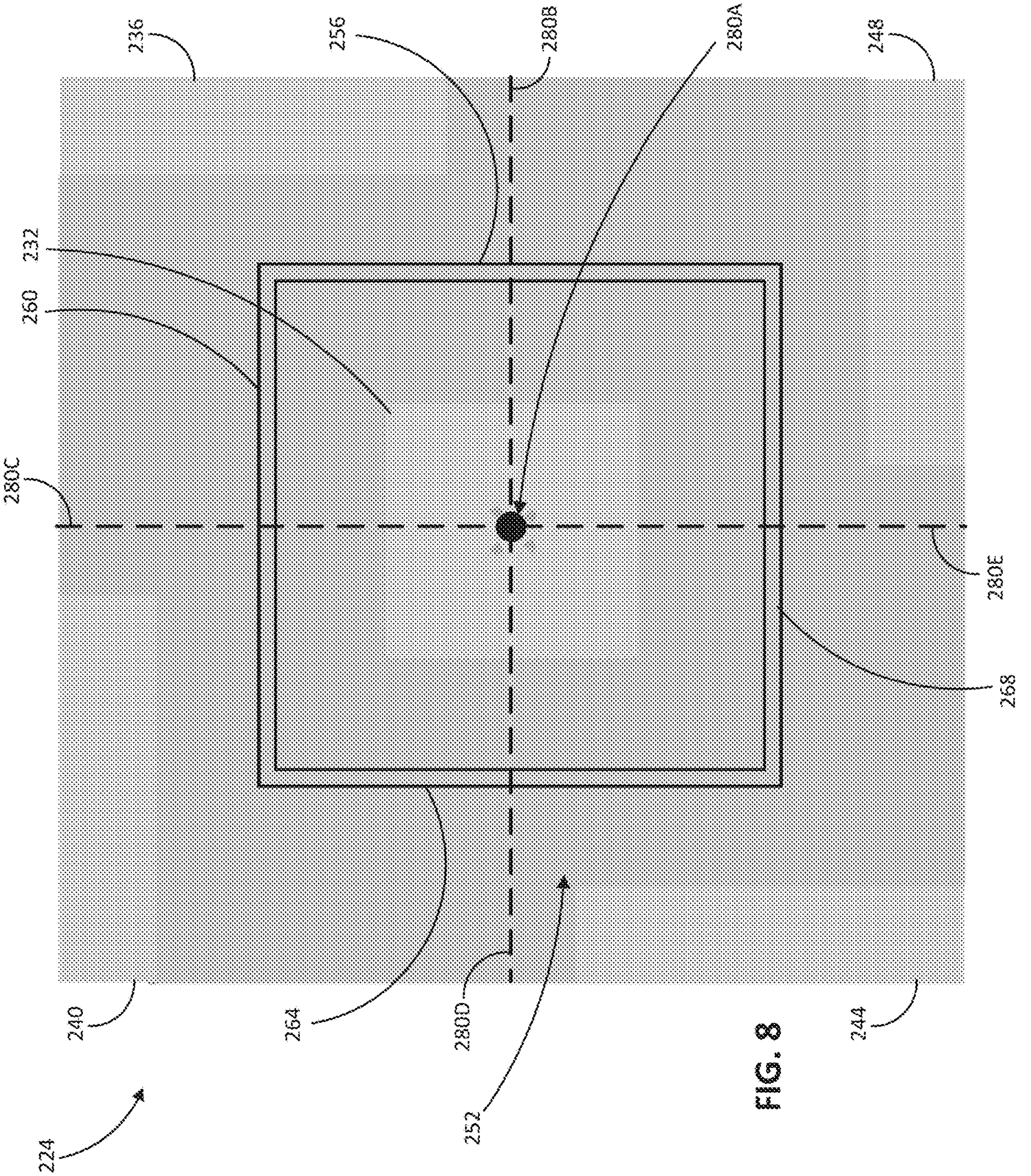
FIG. 8 illustrates a top view of certain elements of the antenna device of FIG. 2 in accordance with various embodiments.

FIG. 8 illustrates a top view of certain elements of the antenna device 200 of FIG. 2 in accordance with various embodiments. The directional antenna 232, the omni-directional antennas 236-248, and the wall structure 252 can be arranged in a rotationally symmetrical arrangement. Specifically, the directional antenna 232, the omni-directional antennas 236-248, and the wall structure 252 can be arranged to form multiple degrees of rotational symmetry. In this way, the multiband antenna system 224 can be tuned to provide equal performance enhancements to each of the omni-directional antennas 236-248. In some implementations, the directional antenna 232, the omni-directional antennas 236-248, and the wall structure 252 can be arranged to form four degrees of rotational symmetry. Specifically, a first axis of symmetry 280B, a second axis of symmetry 280C, a third axis of symmetry 280D, and a fourth axis of symmetry 280E can converge at a common point 280A. The arrangement of the directional antenna 232, the omni-directional antennas 236-248, and the wall structure 252 may appear to be the same if the multiband antenna system 224 is rotated ninety degrees.

During design of the multiband antenna system 224, if there is rotational symmetry between the directional antenna 232, the omni-directional antennas 236-248, and the wall structure 252, the performance of each of the omni-directional antennas 236-248 can be selected by only tuning the performance of one of the omni-directional antennas 236-248 because each of the omni-directional antennas 236-248 is arranged in a common orientation and distance to the wall structure 252 and the directional antenna 232. Thus, in addition to providing equal performance enhancements to each of the omni-directional antennas 236-248, the rotational symmetry of the directional antenna 232, the omni-directional antennas 236-248, and the wall structure 252 can simplify the design process of the multiband antenna system 224.

Figure 9:
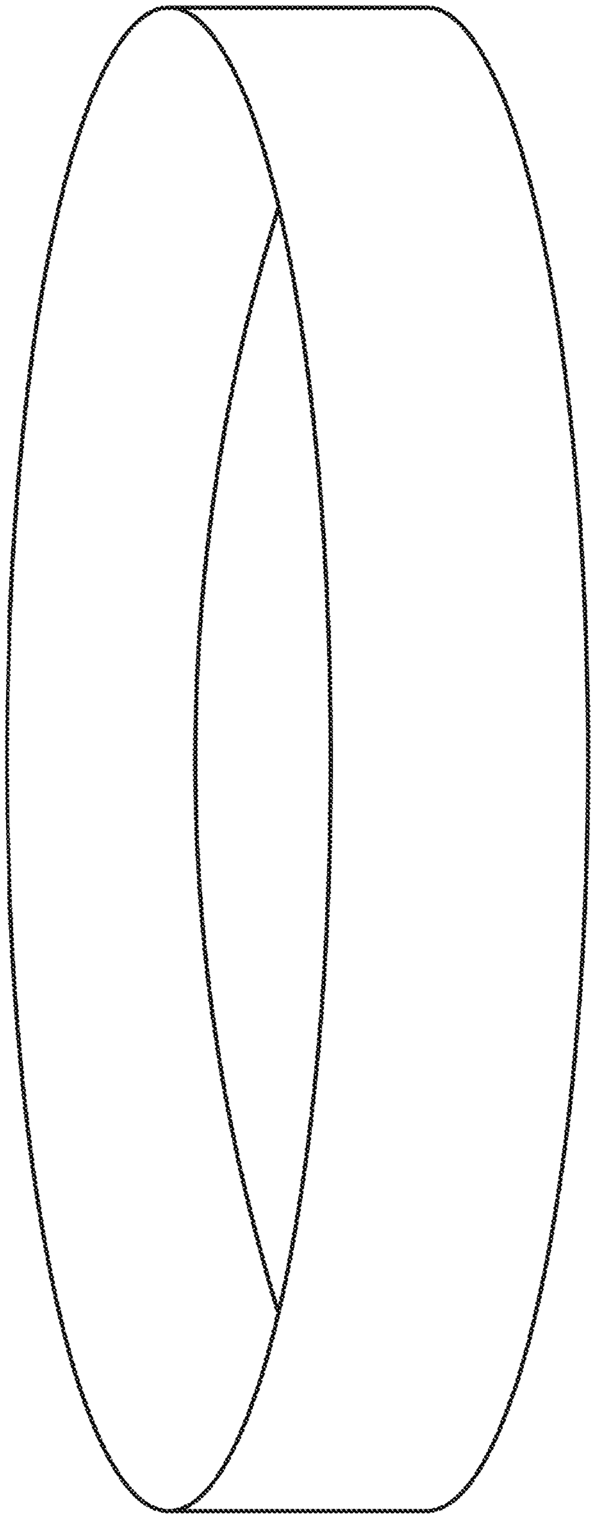
FIG. 9 illustrates a perspective view of a wall structure in accordance with various embodiments.

FIG. 9 illustrates a perspective view of a wall structure 300 in accordance with various embodiments. The wall structure 300 can be a fully and/or partially continuous cylindrical wall. The wall structure 300 can be used as the wall structure 252 in FIGS. 4-8. The wall structure 300 can provide rotational symmetry similar to the wall structure 252 in FIGS. 4-8 (e.g., four degrees of rotational symmetry).

Figure 10:
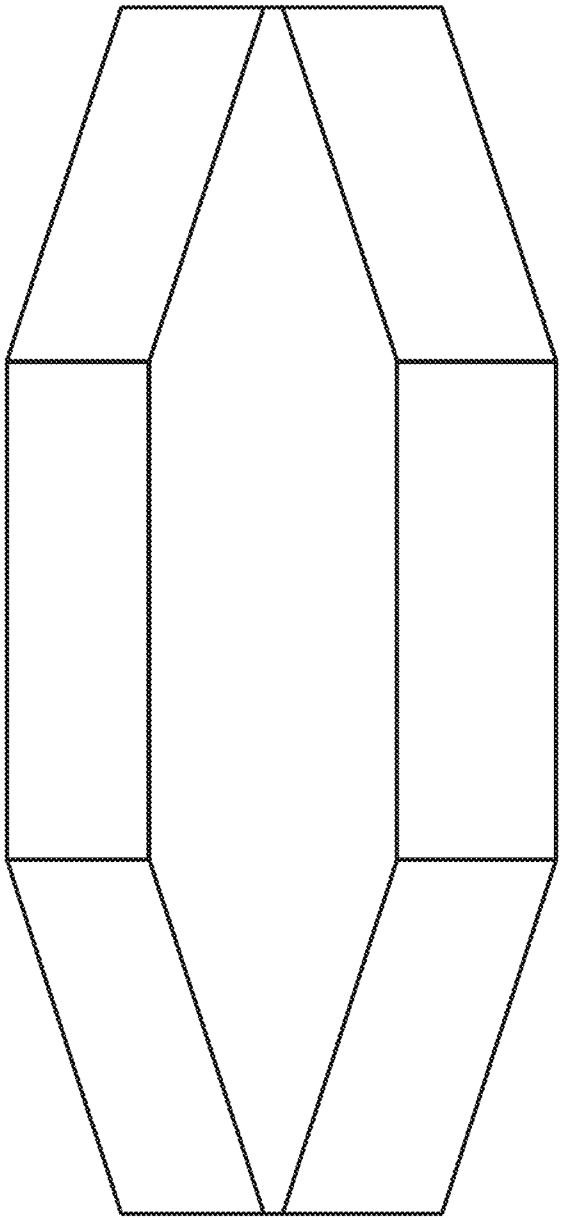
FIG. 10 illustrates a perspective view of another wall structure in accordance with various embodiments.

FIG. 10 illustrates a perspective view of another wall structure 400 in accordance with various embodiments. The wall structure 400 can be a fully and/or partially continuous octagonal wall. The wall structure 400 can be used as the wall structure 252 in FIGS. 4-8. The wall structure 400 can provide rotational symmetry similar to the wall structure 252 in FIGS. 4-8 (e.g., four degrees of rotational symmetry).

Figure 11:
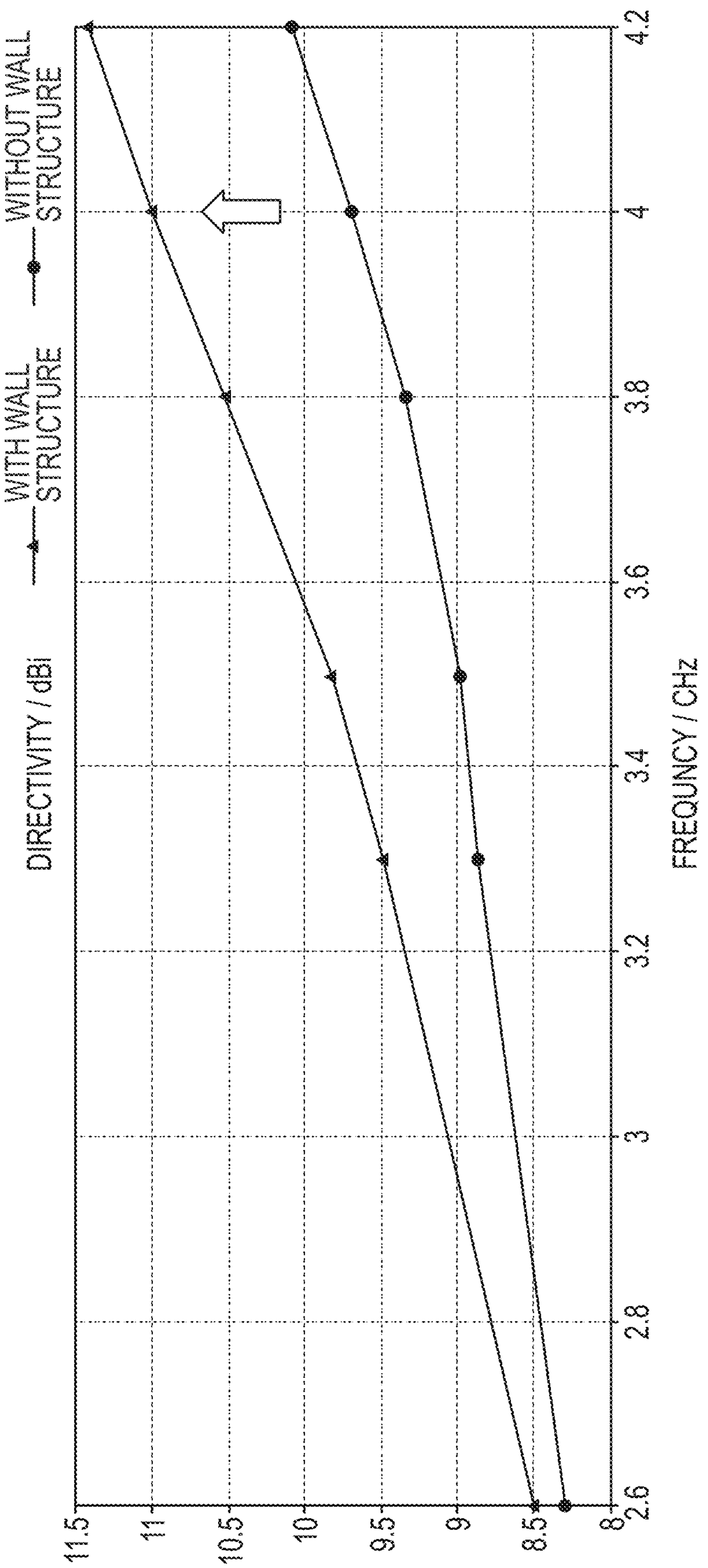
FIG. 11 illustrates a graph of directivity performance for a directional antenna in accordance with various embodiments.

FIG. 11 illustrates a graph of peak directivity performance for a directional antenna in accordance with various embodiments. Specifically, FIG. 11 compares directivity performance for a directional antenna (e.g., directional antenna 232 in FIG. 4) with and without a wall structure present (e.g., with and without wall structure 252 in FIG. 4). Depending on the frequency, directivity performance may be increased about five percent to about fifteen percent with the wall structure present.

Figure 12:
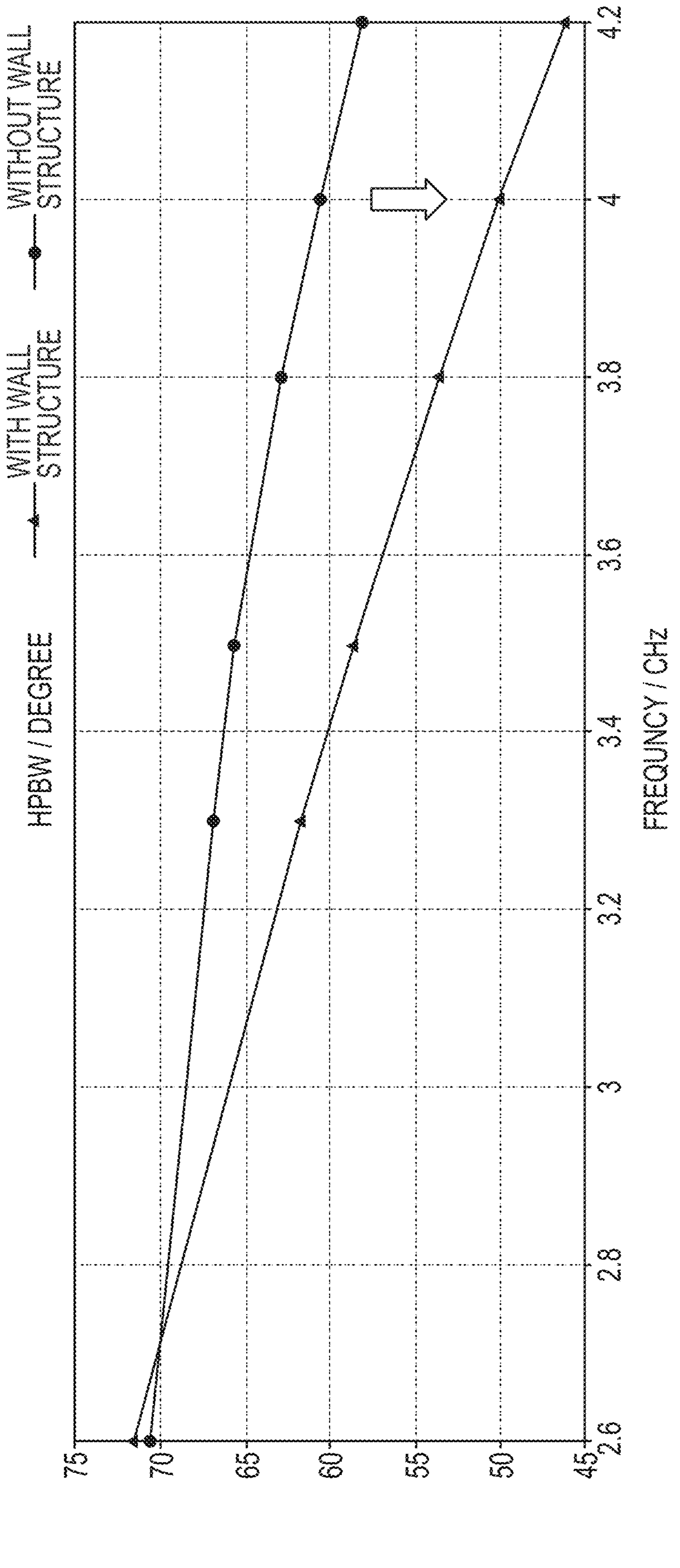
FIG. 12 illustrates a graph of half power beam width performance for a directional antenna in accordance with various embodiments.

FIG. 12 illustrates a graph of half power beam width performance for a directional antenna in accordance with various embodiments. Specifically, FIG. 12 compares half power beam width performance for a directional antenna (e.g., directional antenna 232 in FIG. 4) with and without a wall structure present (e.g., with and without wall structure 252 in FIG. 4). Depending on the frequency, half power beam width performance may be improved by up to about fifteen percent with the wall structure present.

Figure 13:
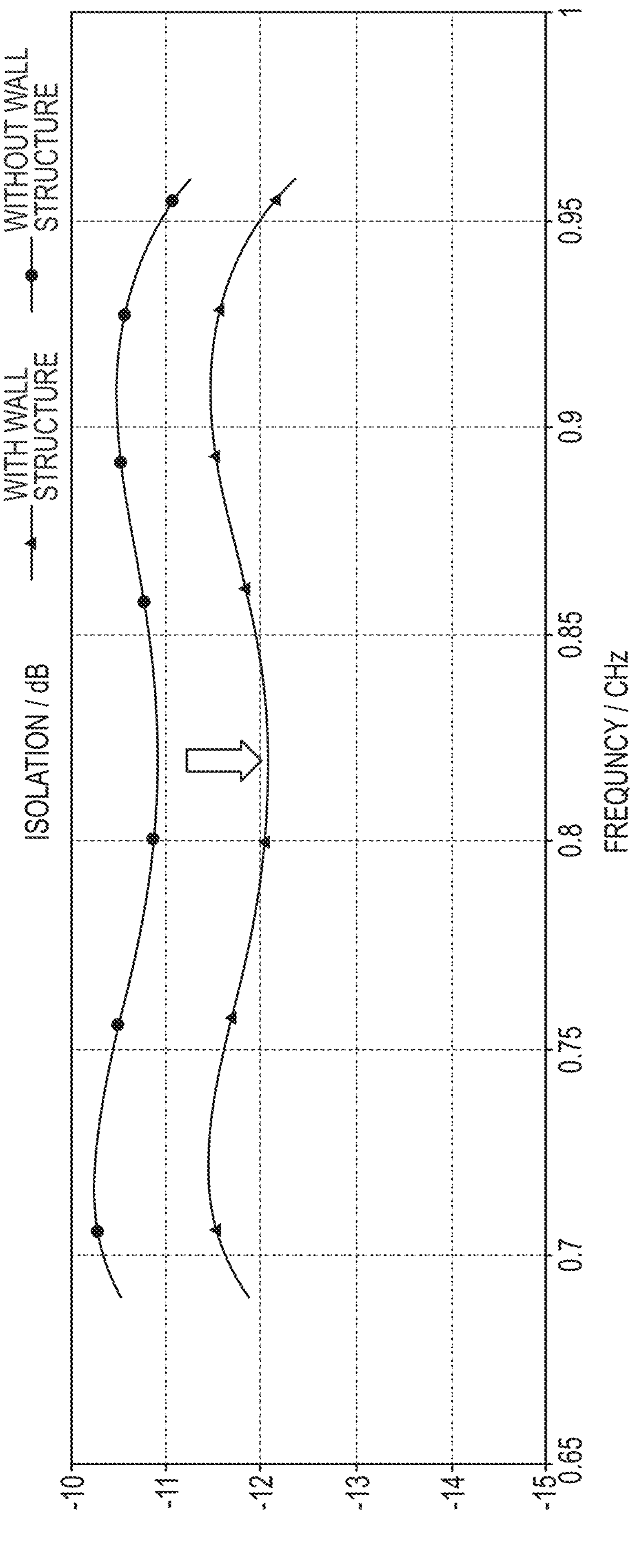
FIG. 13 illustrates a graph of isolation performance for a omni-directional antenna in accordance with various embodiments.

FIG. 13 illustrates a graph of isolation performance for an omni-directional antenna in accordance with various embodiments. Specifically, FIG. 13 compares isolation performance for a omni-directional antenna (e.g., the first omni-directional antenna 236 in FIG. 4) with and without a wall structure present (e.g., with and without wall structure 252 in FIG. 4). Depending on the frequency, isolation performance may be improved by up to about fifteen percent with the wall structure present.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed embodiments may be practiced other than as explicitly described herein. For example, an antenna device may be installed on a building rather than a tower structure.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g., 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The term "coupled" refers to elements being attached to each other either directly (in direct contact with each other) or indirectly (having one or more elements between and attaching the two elements). The term "connected" refers to elements being attached to each other directly (in direct contact with each other). Either "coupled" or "connected" may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

The invention claimed is:

1. An antenna device comprising:

a ground plane;

a plurality of omni-directional antennas connected to the ground plane;

a directional antenna connected to the ground plane; and a wall structure comprising a metal and connected to the ground plane, the wall structure surrounding the directional antenna and disposed between the directional antenna and the plurality of omni-directional antennas.

2. The antenna device of claim 1, wherein the wall structure has at least two planes of symmetry.

3. The antenna device of claim 1, wherein the wall structure has at least three planes of symmetry.

4. The antenna device of claim 1, wherein each omni-directional antenna included in the plurality of omni-directional antennas is arranged in a common orientation and distance in relation to the wall structure.

5. The antenna device of claim 1, wherein the wall structure and the plurality of omni-directional antennas are positioned in a rotationally symmetrical arrangement.

6. The antenna device of claim 1, wherein the wall structure, the plurality of omni-directional antennas, and the directional antenna are positioned in a rotationally symmetrical arrangement.

7. The antenna device of claim 1, wherein the antenna device is a 5G antenna device.

8. The antenna device of claim 1, wherein the wall structure comprises an extrusion.

9. The antenna device of claim 1, wherein:

the wall structure comprises at least four walls, each wall included in the at least four walls comprising a flat surface; and the directional antenna comprises four approximately straight edges, and each of the at least four walls is arranged approximately parallel to one of the four approximately straight edges.

10. The antenna device of claim 9, wherein each omni-directional antenna included in the plurality of omni-directional antennas comprises a substantially flat face arranged approximately parallel to one of the four approximately straight edges.

11. The antenna device of claim 1, wherein the wall structure is configured to function as a heat sink for at least one of the ground plane, the directional antenna, or the plurality of omni-directional antennas.

12. The antenna device of claim 1, wherein the wall structure is configured to enhance the peak gain of the directional antenna as compared to if the wall structure was not present.

13. The antenna device of claim 1, wherein the wall structure is configured to enhance the isolation of each omni-directional antenna included in the plurality of omni-directional antennas as compared to if the wall structure was not present.

14. The antenna device of claim 1, wherein the wall structure comprises at least four walls, each wall included in the at least four walls comprising a flat surface facing at least one of the omni-directional antennas included in the plurality of omni-directional antennas.

15. The antenna device of claim 1, wherein the wall structure comprises stainless steel or electroplated plastic.

16. The antenna device of claim 1, comprising:

a case enclosing the ground plane, the plurality of omni-directional antennas, the directional antenna, and the wall structure; and a motherboard coupled to the directional antenna and the plurality of omni-directional antennas, wherein the case further encloses the motherboard.

17. An antenna device comprising:

a ground plane;

a plurality of omni-directional antennas connected to the ground plane, the plurality of omni-directional antennas associated with a first frequency band;

a directional antenna connected to the ground plane, the directional antenna associated with a second frequency band; and a wall structure comprising a metal and connected to the ground plane, the wall structure surrounding the directional antenna and disposed between the directional antenna and the plurality of omni-directional antennas, wherein the first frequency band is lower than the second frequency band by at least one GHz.

18. The antenna device of claim 17, wherein:

the wall structure comprises at least four walls, each wall included in the at least four walls comprising a flat surface; and the directional antenna comprises four approximately straight edges, and each of the at least four walls is arranged approximately parallel to one of the four approximately straight edges.

19. The antenna device of claim 18, wherein each omni-directional antenna included in the plurality of omni-directional antennas comprises a substantially flat face arranged approximately parallel to one of the four approximately straight edges.

20. The antenna device of claim 17, wherein the wall structure is configured to function as a heat sink for at least one of the ground plane, the directional antenna, or the plurality of omni-directional antennas.

21. The antenna device of claim 17, wherein the wall structure is configured to enhance the peak gain of the directional antenna as compared to if the wall structure was not present.

22. The antenna device of claim 17, wherein the wall structure is configured to enhance the isolation of each omni-directional antenna included in the plurality of omni-directional antennas as compared to if the wall structure was not present.

23. The antenna device of claim 17, wherein each omni-directional antenna included in the plurality of omni-directional antennas is arranged in a common orientation and distance in relation to the wall structure.

24. The antenna device of claim 17, wherein the wall structure, the plurality of omni-directional antennas, and the directional antenna are positioned in a rotationally symmetrical arrangement.

* * * * *